(12) United States Patent
Omori

(10) Patent No.: US 6,815,080 B2
(45) Date of Patent: Nov. 9, 2004

(54) THERMOPLASTIC RESIN COMPOSITION AND MULTI-LAYER LAMINATE

(75) Inventor: Masatoshi Omori, Mie-ken (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/412,667

(22) Filed: Apr. 14, 2003

(65) Prior Publication Data

US 2004/0006182 A1 Jan. 8, 2004

(30) Foreign Application Priority Data

Apr. 15, 2002 (JP) .......................................... 2002-112222

(51) Int. Cl.$^7$ ......................... B32B 27/06; B32B 27/08; B32B 27/33; B32B 27/36

(52) U.S. Cl. ..................... 428/483; 428/480; 428/515; 428/516; 428/520; 428/522; 428/523; 525/56; 525/58; 525/60; 525/61; 525/63; 525/88; 525/92 R; 525/92 F; 528/300; 528/301; 528/306

(58) Field of Search ................................ 428/480, 483, 428/515, 516, 520, 522, 523; 525/56, 58, 60, 61, 63, 88, 92 R, 92 F; 528/274, 300, 301, 306

(56) References Cited

U.S. PATENT DOCUMENTS

| 4,349,644 | A | * | 9/1982 | Iwanami et al. ............... 525/57 |
| 5,300,563 | A | * | 4/1994 | Kiang et al. ................... 525/42 |
| 5,349,000 | A | * | 9/1994 | Robeson et al. ............. 524/388 |
| 5,843,502 | A | * | 12/1998 | Ramesh ........................ 426/127 |
| 6,087,442 | A | * | 7/2000 | LaFleur et al. ................. 525/57 |
| 6,462,129 | B1 | * | 10/2002 | Bertin et al. .................... 525/56 |
| 6,586,091 | B2 | * | 7/2003 | Iijima et al. ........... 428/355 AC |
| 2003/0059606 | A1 | * | 3/2003 | Iijima et al. ................. 428/343 |

FOREIGN PATENT DOCUMENTS

| JP | 62-164504 | * | 7/1987 |
| JP | 2002-144486 | * | 5/2002 |
| JP | 2002-155135 | * | 5/2002 |
| WO | WO 02/18134 | * | 3/2002 |

* cited by examiner

Primary Examiner—Vivian Chen
(74) Attorney, Agent, or Firm—Nixon & Vanderhye P.C.

(57) ABSTRACT

The present invention relates to a thermoplastic resin composition comprising an ethylene-vinyl alcohol copolymer and a modified polyester type thermoplastic elastomer produced by modifying a polyester type thermoplastic elastomer with an unsaturated carboxylic acid or its derivative, and a multi-layer laminate comprising a layer A comprising the thermoplastic resin composition as defined in the above, and at least one layer B comprising a thermoplastic resin composition other than the composition as defined in the above.

14 Claims, No Drawings

THERMOPLASTIC RESIN COMPOSITION AND MULTI-LAYER LAMINATE

BACKGROUND OF THE INVENTION

The present invention relates to a thermoplastic resin composition, and more particularly, to a thermoplastic resin composition comprising an ethylene-vinyl alcohol copolymer and a modified polyester type thermoplastic elastomer which has an excellent compatibility with other resins, and exhibits a high gas-barrier property and an excellent impact strength as well as a good fluidity upon melting and, therefore, a good injection moldability. The present invention also relates to a multi-layer laminate comprising a layer comprising the above thermoplastic resin composition and at least one layers comprising a thermoplastic resin composition other than the above composition.

In general, ethylene-vinyl alcohol copolymer resins (hereinafter referred to merely as "EVOH resins") are thermoplastic resins having excellent oxygen impermeability and mechanical strength as well as good moldability and, therefore, have been extensively used in various applications such as films, sheets, materials for containers, textile fibers and pipes. However, the EVOH resins show a poor flexibility and especially are deteriorated in impact strength. In order to solve these problems, it has been conventionally attempted to enhance the stretchability and flexibility of molded products obtained from the EVOH resins by adding polyolefins thereto as described in Japanese Patent Application Laid-Open (KOKAI) Nos. 5-98084 and 2000-219792. However, according to the present inventors' studies, it has been found that since such a composition is insufficient in compatibility between the EVOH resins and the polyolefins, the resultant molded products are not only still deteriorated in physical properties, reproducibility of appearance, and moldability, but also exhibits a considerably low gas-barrier property as compared to that of the EVOH resins, thereby failing to obtain satisfactory products.

On the other hand, it has been expected that polyester type thermoplastic elastomers having a good flexibility are widely used as alternate materials for vulcanized rubbers in various application fields. However, the polyester type thermoplastic elastomers are still insufficient in gas-barrier property such as oxygen impermeability in spite of good moldability and excellent low- and high-temperature characteristics thereof.

SUMMARY OF THE INVENTION

An object of the present invention is to provide a thermoplastic resin composition that is free from defects of both of the EVOH resins and polyester type thermoplastic elastomers, exhibits a high gas-barrier property, appropriate flexibility and impact resistance, a high toughness and a good injection moldability, and is capable of producing a molded product that is free from delamination of its surface layer.

Another object of the present invention is to provide a multi-layer laminate having a layer comprising the thermoplastic resin composition described above.

As a result of the present inventors' earnest studies for solving the above problems, it has been found that the above objects can be achieved by such a resin composition comprising a specific modified polyester type thermoplastic elastomer and an EVOH resin. The present invention has been attained on the basis of the above finding.

To accomplish the aims, in a first aspect of the present invention, there is provided a thermoplastic resin composition comprising an ethylene-vinyl alcohol copolymer and a modified polyester-based thermoplastic elastomer produced by modifying a polyester-based thermoplastic elastomer with an unsaturated carboxylic acid or its derivative.

In a second aspect of the present invention, there is provided a multi-layer laminate comprising a layer A comprising the thermoplastic resin composition as defined in the first aspect, and at least one layer B comprising a thermoplastic resin composition other than the composition as defined in the first aspect which is laminated on one or both surfaces of the layer A.

DETAILED DESCRIPTION OF THE INVENTION

The present invention will be described in detail below.

The modified polyester type elastomer constituting the thermoplastic resin composition of the present invention is obtained by modifying a polyester type thermoplastic elastomer with an unsaturated carboxylic acid or its derivative. The modification of the polyester type thermoplastic elastomer with the unsaturated carboxylic acid or its derivative is preferably performed in the presence of a radical generator. It is considered that the modification reaction is caused mainly by graft reaction in which the unsaturated carboxylic acid or its derivative is added to the polyester type thermoplastic elastomer, and further by addition reaction in which the unsaturated carboxylic acid or its derivative is added to an end of the polyester type thermoplastic elastomer, transesterification reaction, decomposition reaction, etc.

The polyester type thermoplastic elastomer to be modified is preferably comprises an aromatic polyester as a hard segment and polyalkylene ether glycol or an aliphatic polyester as a soft segment. Of these polyester type thermoplastic elastomers, more preferred are polyester polyether block copolymers containing polyalkylene ether glycol as a soft segment, and still more preferred are those block copolymers containing a polyalkylene ether glycol segment in an amount of 5 to 90% by weight, preferably 30 to 80% by weight, more preferably 55 to 80% by weight. When the content of the polyalkylene ether glycol segment in the block copolymer is more than 90% by weight, the obtained compositions may fail to show a sufficient hardness, and the injection-molded product obtained therefrom tends to suffer from delamination of its surface layer. When the content of the polyalkylene ether glycol segment in the block copolymer is less than 5% by weight, the obtained composition may be deteriorated in elasticity, resulting in insufficient flexibility and impact resistance, and further the injection molded product obtained therefrom tends to suffer from delamination of its surface layer. The content of the polyalkylene ether glycol segment in the block copolymer can be calculated from chemical shift and content of hydrogen atoms as measured by NMR.

The polyester polyether block copolymer used in the present invention is preferably produced by polycondensing an oligomer obtained by esterification reaction or transesterification reaction between i) a $C_2$ to $C_{12}$ aliphatic and/or alicyclic diol, ii) an aromatic and/or aliphatic dicarboxylic acid or an alkyl ester thereof, and iii) polyalkylene ether glycol having a weight-average molecular weight of 400 to 6,000.

As the $C_2$ to $C_{12}$ aliphatic and/or alicyclic diol i), there may be used those ordinarily used as raw materials for polyesters, especially polyester type elastomers. Examples of the $C_2$ to $C_{12}$ aliphatic and/or alicyclic diol i) may include ethylene glycol, propylene glycol, trimethylene glycol, 1,4- butane diol, 1,4-cyclohexane diol, 1,4-cyclohexane dimethanol, or the like. Of these $C_2$ to $C_{12}$ aliphatic and/or alicyclic diols, preferred are 1,4-butane diol and ethylene glycol, and more preferred is 1,4-butane diol. These diols may be used alone or in the form of a mixture of any two or more thereof.

As the aromatic dicarboxylic acid ii), there may be used those ordinarily used as raw materials for polyesters, especially polyester type elastomers. Examples of the aromatic dicarboxylic acid ii) may include terephthalic acid, isophthalic acid, phthalic acid, 2,6-naphthalene dicarboxylic acid or the like. Of these aromatic dicarboxylic acids, preferred are terephthalic acid and 2,6-naphthalene dicarboxylic acid, and more preferred is terephthalic acid. These aromatic dicarboxylic acids may be used alone or in the form of a mixture of any two or more thereof.

As the aromatic dicarboxylic acid alkyl ester ii), there may be preferably used dimethyl esters or diethyl esters of the above aromatic dicarboxylic acids. Of these alkyl esters, preferred are dimethyl terephthalate and 2,6-dimethylnaphthalene dicarboxylate.

As the aliphatic dicarboxylic acid ii), there may be preferably used cyclohexane dicarboxylic acids. As the alkyl ester of the aliphatic dicarboxylic acid ii), there may be suitably used dimethyl esters or diethyl esters of the cyclohexane dicarboxylic acids.

In addition to the above components i) and ii), a small amount of a trifunctional alcohol, a tricarboxylic acid or an ester thereof may be copolymerized therewith. Further, aliphatic dicarboxylic acids such as adipic acid or dialkyl esters thereof may also be used as comonomers thereof.

As the polyalkylene ether glycol iii), there may be suitably used those having a weight-average molecular weight of usually 400 to 6,000, preferably 500 to 4,000, more preferably 600 to 3,000. When the weight-average molecular weight of the polyalkylene ether glycol is less than 400, the obtained copolymer may fail to show properties as block copolymer. When the weight-average molecular weight of the polyalkylene ether glycol is more than 6,000, the reaction system tends to suffer from phase separation, resulting in deteriorated properties of the obtained polymer. Meanwhile, the weight-average molecular weight used herein means the value measured by gel permeation chromatography (GPC). As the calibration for GPC, there may be used, for example, "POLYTETRAHYDROFURAN CALIBRATION KIT" manufactured by POLYMER LABORATORIES INC., GB.

Specific examples of the polyalkylene ether glycol may include polyethylene glycol, poly(1,2- and/or 1,3-propylene ether)glycol, poly(tetramethylene ether)glycol, poly(hexamethylene ether)glycol or the like.

Examples of commercially available products of the polyester type elastomers may include "PRIMALLOY" produced by Mitsubishi Chemical Corporation, "PELPRENE" produced by Toyo Boseki Co., Ltd., "Hytrel" produced by Toray•DuPont Co., Ltd., or the like.

Examples of the unsaturated carboxylic acid or its derivatives may include unsaturated carboxylic acids such as acrylic acid, methacrylic acid, maleic acid, fumaric acid, tetrahydrophthalic acid, itaconic acid, citraconic acid, crotonic acid and isocrotonic acid; unsaturated carboxylic acid anhydrides such as succinic 2-octene-1-yl anhydride, succinic 2-dodecene-1-yl anhydride, succinic 2-octadecene-1-yl anhydride, maleic anhydride, 2,3-dimethyl maleic anhydride, bromomaleic anhydride, dichloromaleic anhydride, citraconic anhydride, itaconic anhydride, 1-butene-3,4-dicarboxylic anhydride, 1-cyclopentene-1,2-dicarboxylic anhydride, 1,2,3,6-tetrahydrophthalic anhydride, 3,4,5,6-tetrahydrophthalic anhydride, exo-3,6-epoxy-1,2,3,6-tetrahydrophthalic anhydride, 5-norbornene-2,3-dicarboxylic anhydride, methyl-5-norbornene-2,3-dicarboxylic anhydride, endo-bicyclo[2.2.2]oct-5-ene-2,3-dicarboxylic anhydride and bicyclo[2.2.2]oct-7-ene-2,3,5,6-tetracarboxylic anhydride; unsaturated carboxylic acid esters such as methyl (meth)acrylate, ethyl (meth)acrylate, propyl (meth)acrylate, butyl (meth)acrylate, hexyl (meth)acrylate, octyl (meth)acrylate, 2-ethylhexyl (meth)acrylate, lauryl (meth)acrylate, stearyl (meth)acrylate, glycidyl (meth)acrylate, dimethyl maleate, 2-ethylhexyl maleate and 2-hydroxyethyl (meth)acrylate; or the like. Of these unsaturated carboxylic acids and derivatives thereof, preferred are the unsaturated carboxylic anhydrides. Meanwhile, "(meth)acryl", used herein means "acryl or methacryl".

These unsaturated carboxylic acids or derivatives thereof can be appropriately selected according to kinds of the copolymers containing the polyalkylene ether glycol segment to be modified as well as modification conditions, and may be used in combination of any two or more thereof. Also, the unsaturated carboxylic acids or derivatives thereof may be added in the form of a solution obtained by dissolving these compounds in an organic solvent or the like.

In the above modification, the amount of the unsaturated carboxylic acid or its derivative blended is usually 0.01 to 30 parts by weight, preferably 0.05 to 5 parts by weight, more preferably 0.1 to 1 part by weight based on 100 parts by weight of the polyester type thermoplastic elastomer. When the amount of the unsaturated carboxylic acid or its derivative blended is less than 0.01 part by weight, the modification of the polyester type thermoplastic elastomer therewith tends to be insufficient. As a result, even when the thermoplastic resin composition obtained by blending such a modified polyester type thermoplastic elastomer with the EVOH resin is injection-molded, the resultant injection-molded product tends to suffer from delamination of its surface layer because of a poor compatibility therebetween. When the amount of the unsaturated carboxylic acid or its derivative blended is more than 30 parts by weight, the obtained modified polyester type elastomer tends to be deteriorated in viscosity upon melting. As a result, the thermoplastic resin composition obtained by blending such a modified polyester type elastomer with the EVOH resin tends to show a poor moldability.

Examples of the radical generator used in the present invention for the above modification may include organic or inorganic peroxides such as t-butyl hydroperoxide, cumene hydroperoxide, 2,5-dimethylhexane-2,5-dihydroperoxide, 2,5-dimethyl-2,5-bis(t-butyloxy)hexane, 3,5,5-trimethylhexanonyl peroxide, t-butyl peroxybenzoate, benzoyl peroxide, dicumyl peroxide, 1,3-bis(t-butylperoxyisopropyl)benzene, dibutyl peroxide, methyl ethyl ketone peroxide, potassium peroxide and hydrogen peroxide; azo compounds such as 2,2'-azobisisobutylonitrile, 2,2'-azobis(isobutylamido)dihalide, 2,2'-azobis[2-methyl-N-(2-hydroxyethyl)propionamide] and azo-di-t-butane; carbon radical generators such as dicumyl; or the like.

The radical generator may be appropriately selected from the above compounds according to kinds of the polyester type elastomer and the unsaturated carboxylic acid or its derivative used for the modification treatment, as well as the modification conditions. These radical generators may be used in combination of any two or more thereof. Also, the radical generators may be added in the form of a solution obtained by dissolving the above compounds in an organic solvent, etc.

The amount of the radical generator blended upon the modification is usually 0.001 to 3 parts by weight, preferably 0.005 to 0.5 part by weight, more preferably 0.01 to 0.2 part by weight, especially preferably 0.01 to 0.1 part by weight based on 100 parts by weight of the polyester type thermoplastic elastomer. When the amount of the radical generator blended is less than 0.001 part by weight, the modification tends to become insufficient. As a result, even when the thermoplastic resin composition obtained by blending the modified polyester type thermoplastic elastomer with the EVOH resin is injection-molded, the resultant injection-molded product tends to suffer from delamination of its surface layer because of a poor compatibility therebetween. When the amount of the radical generator blended is more than 3 parts by weight, the obtained modified polyester type elastomer tends to be deteriorated in viscosity upon melting. As a result, the thermoplastic resin composition obtained by blending such a modified polyester type elastomer with the EVOH resin tends to show a poor moldability.

As the method for obtaining the modified polyester type elastomer by using the polyester type thermoplastic elastomer, the unsaturated carboxylic acid or its derivative and the radical generator, there may be used various known methods such as melt-kneading reaction method, solution reaction method, suspension reaction method or the like. Of these methods, preferred is the melt-kneading reaction method.

In the melt-kneading reaction method, the polyester type thermoplastic elastomer, the unsaturated carboxylic acid or its derivative and the radical generator are uniformly mixed together at predetermined blending ratios using Henschel mixer, ribbon blender, twin cylinder mixer, etc., and then the resultant mixture is melt-kneaded using an ordinary kneader such as Banbury mixer, kneader, rolls, single-screw kneading extruder and multi-screw kneading extruder such as twin-screw extruder. If required, the unsaturated carboxylic acid or its derivative and the radical generator may be respectively added to the reaction system in the form of a solution obtained by dissolving these components in an organic solvent.

The melt-kneading of the respective components may be performed in a temperature range of usually 100 to 300° C., preferably 120 to 280° C., more preferably 150 to 250° C. so as to prevent heat deterioration of the resin used.

The modified polyester type elastomer has a JIS-D hardness (based on durometer type-D as measured according to JIS K6235) of usually 10 to 80, preferably 15 to 70, more preferably 20 to 60. When the JIS-D hardness of the modified polyester type elastomer is less than 10, the obtained composition tends to be deteriorated in mechanical strength. When the JIS-D hardness is more than 80, the obtained composition tends to be deteriorated in flexibility and impact resistance.

The modification degree of the modified polyester type elastomer used in the present invention can be calculated according to the following formula (1) from values measured by the below-mentioned infrared spectrum method (hereinafter referred to as "normalized modification ratio). The normalized modification ratio of the modified polyester type elastomer is usually 0.01 to 15, preferably 0.03 to 2.5, more preferably 0.1 to 2.0, especially preferably 0.2 to 1.8. When the normalized modification ratio of the modified polyester type elastomer is less than 0.01, the obtained molded product tends to suffer from delamination of its surface layer. When the normalized modification ratio of the modified polyester type elastomer is more than 15, the obtained composition tends to be considerably deteriorated in mechanical strength.

$$\text{Normalized modification ratio} = A_{1786}/(A_{st} \times r) \quad (1)$$

In the formula (1), $A_{1786}$ represents a peak intensity of infrared spectrum of a 20 μm-thick film made of the modified polyester type elastomer as measured at a wave number of 1,786 $cm^{-1}$, and $A_{st}$ represents a peak intensity of infrared spectrum of a 20 μm-thick film as a standard specimen made of polyester type elastomer containing a polyalkylene ether glycol segment in an amount of 65% by weight as measured at a standard wave number. The standard wave number may be selected from such wave numbers that are not influenced by the modification and have no adjacent overlapped absorption peak. The symbol r in the formula (1) is the value obtained by dividing a molar fraction of a polyester segment contained in the modified polyester type elastomer by a molar fraction of a polyester segment contained in the standard specimen. The symbol r of the standard specimen is equal to 1.

More specifically, the normalized modification ratio of the modified polyester type elastomer is determined by the following method. That is, the 20 μm-thick film specimen is dried under reduced pressure at 100° C. for 15 hours to remove any unreacted compounds therefrom, and then subjected to measurement of infrared spectrum. Then, the height of an absorption peak due to stretching vibration of carbonyl group derived from the acid anhydride which is observed at a wave number of 1,786 $cm^{-1}$ in the thus measured infrared spectrum (height from a base line as a tangential line connecting valleys on opposite sides of an absorption band ranging from 1,750 to 1,820 $cm^{-1}$), is calculated and regarded as the "peak intensity $A_{1786}$". On the other hand, the 20 μm-thick film as the standard specimen made of polyester type elastomer containing a polyalkylene ether glycol segment in an amount of 65% by weight is subjected to the same measurement of infrared spectrum. For example, in the case of an aromatic polyester type elastomer having a benzene ring, the height of an absorption peak due to out-of-plane bending vibration of C—H of the benzene ring which is observed at 872 $cm^{-1}$ as a peak at the standard wave number (height from a base line as a tangential line connecting valleys on opposite sides of an absorption band ranging from 850 to 900 $cm^{-1}$, is calculated and regarded as the "peak intensity $A_{st}$".

Form the thus calculated "peak intensity $A_{1786}$" and "peak intensity $A_{st}$", the normalized modification ratio is calculated according to the above formula (1). As described above, the symbol r in the formula (1) is the value obtained by dividing a molar fraction of a polyester segment contained in the modified polyester type elastomer by a molar fraction of a polyester segment contained in the standard specimen. The molar fraction mr of the polyester segment in each specimen is calculated according to the following formula (2):

$$mr=(w1/e1)/[(w1/e1)+(w2/e2)] \quad (2)$$

wherein w1 and w2 are respective weight fractions of polyester segment and polyalkylene ether glycol segment; and e1 and e2 are respective molecular weights of monomer units constituting both the segments.

The ethylene-vinyl alcohol copolymer resin (EVOH resin) constituting the thermoplastic resin composition of the present invention is usually produced by saponification of ethylene-vinyl acetate copolymer. The ethylene content in the EVOH resin is usually 10 to 70 mol %, preferably 20 to 60 mol %. The EVOH resin is preferably such a copolymer obtained by saponifying not less than 95 mol % of a vinyl acetate component of the ethylene-vinyl acetate copolymer. When the ethylene content in the EVOH resin is less than 10 mol %, the obtained composition may become insufficient in gas-barrier property under high-humidity condition. When the ethylene content in the EVOH resin is more than 70 mol %, the obtained composition may fail to show a sufficient gas-barrier property. Also, when the saponification percentage of the vinyl acetate component of the ethylene-vinyl acetate copolymer is less than 95 mol %, the obtained composition tends to be insufficient in gas-barrier property, moisture resistance and heat stability.

The EVOH resin preferably has a melt flow rate (MFR) of 0.5 to 100 g/10 min as measured according to JIS K7210. When the MFR of the EVOH resin is less than 0.5 g/10 min, the obtained composition tends to be deteriorated in moldability, so that the molded product obtained therefrom tends to show a poor appearance. When the MFR of the EVOH resin is more than 100 g/10 min, the obtained composition tends to be insufficient in gas-barrier property.

The thermoplastic resin composition of the present invention may contain, in addition to the above modified polyester type elastomer and the EVOH resin, at least one optional additive selected from the group consisting of other resin components, rubber components, fillers such as talc, calcium carbonate, mica and glass fibers, plasticizers such as paraffin oil, antioxidants, heat stabilizers, light stabilizers, ultraviolet light absorbers, neutralizing agents, lubricants, anti-fogging agents, anti-blocking agents, slip agents, cross-linking agents, cross-linking assistants, colorants, flame retardants, dispersants, antistatic agents, antibacterial agents and fluorescent whiting agents, according to requirements, unless the addition of these additives adversely affects the objects and effects of the present invention. Among them, the addition of at least one antioxidant selected from phenol-based, phosphite-based, thioether-based, aromatic amine-based compounds is preferred.

The thermoplastic resin composition of the present invention preferably contains the EVOH resin in an amount of 5 to 95% by weight based on the total weight of the modified polyester type thermoplastic elastomer and the EVOH resin. In particular, such a thermoplastic resin composition containing 5 to 45% by weight of the modified polyester type thermoplastic elastomer and 95 to 55% by weight of the EVOH resin, more preferably 5 to 30% by weight of the modified polyester type thermoplastic elastomer and 95 to 70% by weight of the EVOH resin, can provide an excellent material well-balanced between all of flexibility, impact resistance and gas-barrier property. When the amount of the EVOH resin blended is less than 5% by weight, the obtained composition may fail to show a good gas-barrier property. When the amount of the EVOH resin blended is more than 95% by weight, the obtained composition tends to be deteriorated in flexibility as well as impact resistance. Meanwhile, the blending ratio of the EVOH resin may be further selected from the above-specified range according to the applications of the obtained thermoplastic resin composition. For example, when it is required to obtain such a composition having a good flexibility, a high impact resistance and an appropriate gas-barrier property, the content of the modified polyester type thermoplastic elastomer may be increased as compared to that of the EVOH resin.

The thermoplastic resin composition of the present invention may be obtained by intimately mixing the modified polyester type elastomer and the EVOH resin, if required, together with optional additives with each other at predetermined ratios and then melt-kneading the resultant mixture, for example, by the same method as used for the modification of the above elastomer. Alternatively, when the polyester type elastomer is modified, the polyester type elastomer may be blended with the unsaturated carboxylic acid or its derivative and the radical generator as well as the EVOH resin, thereby simultaneously conducting the modification of the polyester type elastomer and the production of the thermoplastic resin composition from the resultant modified polyester type elastomer and the EVOH resin. However, usually, the former method of first obtaining the modified polyester type elastomer and then kneading the obtained modified polyester type elastomer with the EVOH resin is preferred since this method enables production of thermoplastic resin compositions having more excellent properties.

The thermoplastic resin composition of the present invention can exhibit an excellent gas-barrier property. In particular, such a thermoplastic resin composition containing the EVOH resin in an amount of 70 to 95% by weight based on the total weight of the modified polyester type thermoplastic elastomer and the EVOH resin can exhibit a more excellent gas-barrier property. More specifically, the thermoplastic resin composition of the present invention has such a gas-barrier property that the oxygen gas permeability thereof as measured by the method described in the following examples is usually not more than 100 $cm^3/m^2 \cdot 24$ hr·atm, preferably not more than 90 $cm^3/m^2 \cdot 24$ hr·atm, more preferably not more than 80 $cm^3/m^2 \cdot 24$ hr·atm.

The thermoplastic resin composition of the present invention can also exhibit an excellent Izod impact resistance. In particular, such a thermoplastic resin composition containing the EVOH resin in an amount of 5 to 95% by weight based on the total weight of the modified polyester type thermoplastic elastomer and the EVOH resin can exhibit a more excellent Izod impact resistance. More specifically, the thermoplastic resin composition of the present invention has an Izod impact resistance as measured according to JIS K7110 of usually not less than 20 $kJ/m^2$, preferably not less than 25 $kJ/m^2$, more preferably not less than 30 $kJ/m^2$.

In addition, the thermoplastic resin composition of the present invention can also exhibit an excellent transparency. In particular, such a thermoplastic resin composition containing the EVOH resin in an amount of 70 to 95% by weight based on the total weight of the modified polyester type thermoplastic elastomer and the EVOH resin can exhibit a more excellent transparency. More specifically, a 20 $\mu$m-thick film made of the thermoplastic resin composition of the present invention has a haze of usually not more than 10%, preferably not more than 8%, more preferably not more than 6%.

The molded products obtained from the thermoplastic resin composition of the present invention can be used, for example, as various industrial components and packaging materials. Specific examples of the molded products may include food packaging containers, medical packaging containers, retort containers, etc., as well as automotive interior trims, automotive exterior trims, automotive functional parts, domestic appliance components, electric devices, electronic parts, electric cables, building materials, sport goods, daily necessaries, fibers and tubes.

The thermoplastic resin composition of the present invention may be used singly or in the form of a multi-layer laminate as a composite with other materials in order to produce films, sheets, bottles, pipes, etc. Also, the thermoplastic resin composition of the present invention can be used as an adhesive layer of the multi-layer laminate.

In the case where the thermoplastic resin composition is used as an adhesive layer for a multi-layer laminate, the resultant multi-layer laminate preferably comprises an A layer comprising the thermoplastic resin composition of the present invention and a B layer or B layers comprising the other thermoplastic resin composition and laminated on one or both surfaces of the A layer. Examples of the other thermoplastic resin composition used for forming the B layer(s) may include polyesters, thermoplastic resin compositions containing the polyesters, polyester type elastomer resins, adhesive resins for polyolefins, EVOH resins, or thermoplastic resin compositions containing the EVOH resins.

In particular, the multi-layer laminate having such a structure that the B layers comprising a polyester resin, preferably a polyethylene terephthalate resin as the other thermoplastic resin composition are laminated on both the surfaces of the A layer, is preferable because of excellent properties thereof, and is useful for the production of various films, sheets, bottles or the like.

As the polyester resin used for forming the B layer, there may be used thermoplastic polyesters generally produced by polycondensing a dicarboxylic acid or its derivative such as lower alkyl ester, acid halide and anhydride thereof, with glycol.

Examples of the dicarboxylic acid may include aromatic and aliphatic dicarboxylic acids such as oxalic acid, malonic acid, succinic acid, glutaric acid, adipic acid, suberic acid, azelaic acid, sebacic acid, terephthalic acid, isophthalic acid, p-carboxyphenoacetic acid, p,p'-dicarboxydiphenyl, p,p'-dicarboxydiphenyl sulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p,p'-dicarboxydiphenyl methane, p,p'-dicarboxydiphenyl propane, p,p'-dicarboxydiphenyl octane, 3-alkyl-4-(β-carboxyethoxy) benzoic acid, 2,6-naphthalene dicarboxylic acid and 2,7-naphthalene dicarboxylic acid. These dicarboxylic acids may be used in the form of a mixture of any two or more thereof. Of these acids, especially preferred is terephthalic acid.

Examples of the glycol may include $C_2$ to $C_{12}$ straight-chain alkylene glycols such as ethylene glycol, 1,3-propylene glycol, 1,6-hexylene glycol, 1,10-decamethylene glycol and 1,12-dodecamethylene glycol, and alicyclic glycols such as 1,4-cyclohexane dimethanol. Also, there may be used those glycols obtained by replacing a part or whole of the above straight-chain alkylene glycol with an aromatic glycol such as p-xylylene glycol, pyrocatechol, resorcinol, hydroquinone or alkyl-substituted derivatives of these compounds. Of these glycols, preferred are $C_2$ to $C_4$ straight-chain alkylene glycols.

As the preferred polyester resins, there may be used polyethylene terephthalate, polypropylene terephthalate and polybutylene terephthalate. Of these polyester resins, especially preferred is polyethylene terephthalate. Examples of commercially available polyester resins may include "NOVAPEX" produced by Mitsubishi Chemical Corporation, "NOVADUR" produced by Mitsubishi Engineering-Plastics Corporation, "DURANEX" produced by Polyplastics Co., Ltd., "PET-G" produced by Eastman Chemical Inc., or the like.

In addition, such a multi-layer laminate comprising an A layer comprising the thermoplastic resin composition of the present invention, a B layer(s) comprising the adhesive resin for polyolefins which is laminated on one or both surfaces of the A layer, and a C layer(s) comprising a polyolefin-based resin which is formed on the B layer, exhibits excellent properties and, therefore, is useful for the production of various films, sheets, bottles, pipes or the like.

The adhesive resin for polyolefins used for forming the B layer may comprise a modified polyolefin resin. Such a modified polyolefin resin may be produced by copolymerizing and/or graft-polymerizing a polyolefin resin composed mainly of an ethylene component and/or a propylene component with α,β-unsaturated carboxylic acid or its derivative.

Examples of the above polyolefin resin may include polyethylene, polypropylene, ethylene-propylene copolymer, ethylene-butene-1 copolymer, ethylene-vinyl acetate copolymer, ethylene-acrylic acid copolymer, ethylene-ethyl acrylate copolymer, ethylene-sodium acrylate copolymer or the like.

Examples of the α,β-unsaturated carboxylic acid or its derivative copolymerized as the comonomer may include acrylic acid, methacrylic acid, methyl methacrylate, sodium acrylate, zinc acrylate, vinyl acetate, glycidyl methacrylate or the like. The above comonomer may be copolymerized in the molecular chain in an amount of not more than 40 mol %. Examples of the copolymerized modified polyolefin resin may include ethylene-vinyl acetate copolymer, ethylene-acrylic acid copolymer, ethylene-ethyl acrylate copolymer, ethylene-sodium acrylate copolymer or the like.

Examples of the α,β-unsaturated carboxylic acid or its derivative graft-polymerized may include acrylic acid, methacrylic acid, ethacrylic acid, maleic acid, fumaric acid, anhydrides or esters of these acids or the like. Of these compounds used for the modification, especially preferred is maleic anhydride. The amount of these compounds grafted is 0.01 to 25% by weight, preferably 0.05 to 15% by weight based on the weight of the polyolefin resin.

The graft polymerization reaction may be conducted by ordinary methods, for example, by melt-mixing the polyolefin resin and the α,β-unsaturated carboxylic acid or its derivative with each other at a resin temperature of 150 to 300° C. Upon the graft polymerization reaction, in order to efficiently carry out the reaction, an organic peroxide such as, for example, α,α'-bis-t-butylperoxy-p-diisopropylbenzene, may be blended in an amount of 0.001 to 0.05% by weight.

As the polyolefin-based resin used for forming the above C layer, there may be used homopolymers of $C_2$ to $C_4$ α-olefins such as ethylene, propylene and 1-butene or crystalline polymers containing these polymers as main components. Specific examples of the polyolefins may include polyethylene, polypropylene and poly-1-butene. These polyolefins may be in the form of not only a homopolymer but also a copolymer with the other $C_2$ to $C_{20}$ α-olefin or a vinyl compound such as vinyl acetate, vinyl chloride, acrylic acid, methacrylic acid and styrene, or a graft copolymer graft-modified with an unsaturated carboxylic acid or its derivative such as maleic anhydride, maleic acid and acrylic acid. Also, the polyolefins may be used in the form of a mixture thereof, or may be cross-linked polyolefin resins prepared by cross-linking these polyolefin resins.

Specific examples of the above polyethylene may include high pressure-processed low-density polyethylene (LDPE), ethylene-propylene copolymer, ethylene-1-butene copolymer, ethylene-4-methyl-1-pentene polymer, ethylene-1-hexene copolymer, high-density polyethylene (HDPE), ethylene-vinyl acetate copolymer, ethylene-acrylic acid copolymer, ethylene-acrylic acid ester copolymer or the like. Of these polyethylenes, preferred are LDPE, ethylene-α-olefin random copolymer and ethylene-vinyl acetate copolymer in view of excellent transparency and low-temperature heat sealability thereof, and more preferred are those polyethylenes having a density of 0.910 to 0.960 $g/cm^3$ and a melting point of 100 to 135° C. Meanwhile, the melt flow rate of the polyethylene is not particularly restricted, and is usually 0.01 to 30 g/10 min, preferably 0.1 to 10 g/10 min from the standpoint of good moldability.

Specific examples of the above polypropylene may include polypropylene (propylene homopolymer), propylene random copolymers having a propylene content of usually not less than 90 mol %, preferably not less than 95 mol %, such as propylene-ethylene random copolymer, propylene-ethylene-1-butene random copolymer and propylene-1-butene random copolymer, and propylene-ethylene block copolymers having an ethylene content of usually 5 to 30 mol %. Of these polypropylenes, preferred are the propylene homopolymer and propylene random copolymers in view of excellent transparency thereof, and more preferred are the polypropylene random copolymers having a melting point of 130 to 140° C. in view of excellent heat sealability thereof. Meanwhile, the melt flow rate of the polypropylene is not particularly restricted, and is usually 0.5 to 30 g/10 min, preferably 0.5 to 10 g/10 min from the standpoint of good moldability.

Specific examples of the above poly-1-butene may include 1-butene homopolymer, 1-butene-ethylene copolymer, 1-butene-propylene copolymer and 1-butene-4-methyl-1-pentene copolymer. Meanwhile, the melt flow rate of the poly-1-butene is not particularly restricted, and is usually 0.01 to 100 g/10 min, preferably 0.03 to 30 g/10 min from the standpoint of good moldability.

As the method for producing the above laminate, there may be used a co-extrusion method in which the thermoplastic resin composition of the present invention and the other thermoplastic resin composition(s) are simultaneously extruded into a laminated structure, and an extrusion-laminating method in which the other molten thermoplastic resin composition is extruded and laminated on a film or sheet comprising the thermoplastic resin composition of the present invention, or to the contrary the molten thermoplastic resin composition of the present invention is extruded and laminated on a film or sheet comprising the other thermoplastic resin composition. Further, the other thermoplastic resin is dry-laminated on a film or sheet comprising the thermoplastic resin composition of the present invention through an adhesive.

The thermoplastic resin composition of the present invention can exhibit a high gas-barrier property and appropriate flexibility and impact resistance as well as a high toughness and a good injection moldability, and is capable of producing a molded product that is free from delamination of its surface layer. Therefore, the thermoplastic resin composition of the present invention has a high industrial value.

EXAMPLES

The present invention will be described in more detail by reference to the following examples. However, the following examples are only illustrative and not intended to limit the scope of the present invention thereto. The respective components used in the following examples and comparative examples are explained below. Meanwhile, in the following examples and comparative examples, various physical properties were measured and evaluated by the following methods.

(1) Melt Flow Rate (MFR)

The MFR was measured at 230° C. under a load of 2.16 kg according to JIS K7210.

(2) Hardness

The D-hardness was measured according to JIS K7251.

(3) Tensile Strength and Tensile Elongation

The tensile strength and tensile elongation were measured according to JIS K6301. In Examples 7 and 8 and Comparative Example 2, these properties were measured using a #3-type dumbbell, and in other Examples and Comparative Examples, the properties were measured using a #1-type dumbbell.

(4) Flexural Modulus

The flexural modulus was measured according to JIS K7203.

(5) Impact Resistance

The Izod impact strength was measured according to JIS K7110. Meanwhile, when no breakage occurred, the result is expressed by "NB" in Tables.

(6) Delamination of Molded Product

The composition was injection-molded at a temperature of 200 to 220° C. to form a flat plate-shaped molded product having a width of 80 mm, a length of 120 mm and a thickness of 2 mm. The resultant molded product was observed to determine whether or not any delamination occurred at its surface. The non-occurrence of the delamination is expressed by A, and the occurrence of the delamination is expressed by B.

(7) Gas Permeability

The composition was preheated at 210° C. under a pressure of 0 kg/cm$^2$ for 7 minutes, and then pressed under a pressure of 100 kg/cm$^2$ for one minute. Then, the obtained material was pressed while cooling at 20° C. under a pressure of 150 kg/cm$^2$ for 2 minutes, thereby forming a pressed film having a thickness of 120 $\mu$m. The oxygen gas permeability and nitrogen gas permeability of the thus obtained pressed film were measured by permeating atmospheric air at 23° C. and 50% RH according to JIS K7126 using a gas permeability measuring apparatus "GPM-200" manufactured by LYSSY Inc. The gas permeability was calculated on the basis that the atmospheric air is constituted by 20% of oxygen gas and 80% of nitrogen gas.

(8) Haze

The haze of a 20 $\mu$m-thick film was measured according to JIS K7105 using a haze meter "DIRECT READING HAZE METER" manufactured by Toyo Seiki Seisaku-sho, Ltd. The 20 $\mu$m-thick single layer film was prepared by using a single-screw extruder with a 35 mm $\phi$ cylinder and a T die. The temperatures at the die and cylinder were 220° C. and 180–210° C., respectively.

Production Example 1

Production of Modified Polyester Type Thermoplastic Elastomer (1) As the polyester type thermoplastic elastomer, there were used the following three kinds of elastomers.

Polyester Type Thermoplastic Elastomer (A-1):

As the polyester type thermoplastic elastomer (A-1), there was used a polyester polyether block copolymer comprising a hard segment composed of polybutylene terephthalate and a soft segment composed of polytetramethylene ether glycol having a weight-average molecular weight of 2,000 in which the content of the polytetramethylene ether glycol was 77% by weight. The polyester type thermoplastic elastomer (A-1) had a flexural modulus of 14.0 MPa, a density of 1.05 g/cm$^3$, a melting peak temperature of 145° C. as measured by a differential scanning calorimeter, and a JIS-D hardness of 24.

Polyester Type Thermoplastic Elastomer (A-2):

As the polyester type thermoplastic elastomer (A-2), there was used a polyester polyether block copolymer comprising a hard segment composed of polybutylene terephthalate and a soft segment composed of polytetramethylene ether glycol having a weight-average molecular weight of 2,000 in which the content of the polytetramethylene ether glycol was 72% by weight. The polyester type thermoplastic elastomer (A-2) had a flexural modulus of 22.6 MPa, a density of 1.07 g/cm$^3$, a melting peak temperature of 160° C. as measured by a differential scanning calorimeter, and a JIS-D hardness of 28.

Polyester type Thermoplastic Elastomer (A-3):

As the polyester type thermoplastic elastomer (A-3), there was used a polyester polyether block copolymer comprising a hard segment composed of polybutylene terephthalate and a soft segment composed of polytetramethylene ether glycol having a weight-average molecular weight of 2,000 in which the content of the polytetramethylene ether glycol was 65% by weight. The polyester type thermoplastic elastomer (A-3) had a flexural modulus of 35.5 MPa, a density of 1.09 g/cm$^3$, a melting peak temperature of 185° C. as measured by a differential scanning calorimeter, and a JIS-D hardness of 34.

(2) Production of Modified Polyester Type Thermoplastic Elastomers (X-1 to X-3)

100 parts by weight of each of the above polyester type thermoplastic elastomers (A-1 to A-3) was intimately mixed with 0.5 part by weight of maleic anhydride as the unsaturated carboxylic acid or its derivative (guaranteed reagent produced by Wako Pure Chemical Industries, Ltd.) and 0.05 part by weight of 2,5-dimethyl-2,5-bis(t-butylperoxy) hexane as the radical generator ("PERHEXA 25B" produced by NOF Corporation). The resultant mixture was melt-kneaded at a temperature of 190 to 220° C. in a kneader "TEX-44 Type" (manufactured by Japan Steel Works, Ltd.; cylinder diameter: 44 mm), and then pelletized by a pelletizer, thereby producing three kinds of modified polyester type elastomers shown in Table 1 below. Meanwhile, in Table 1, the dash "-" represents no addition of the elastomer.

TABLE 1

|  |  | Modified polyester type thermoplastic elastomer |  |  |
|---|---|---|---|---|
|  |  | X-1 | X-2 | X-3 |
| Amount blended (wt. part) |  |  |  |  |
| Polyester type | A-1 | 100 | — | — |
| thermoplastic elastomer | A-2 | — | 100 | — |
|  | A-3 | — | — | 100 |
| Unsaturated carboxylic acid or its derivative |  | 0.5 | 0.5 | 0.5 |
| Radical generator |  | 0.05 | 0.05 | 0.05 |

TABLE 1-continued

|  | Modified polyester type thermoplastic elastomer |  |  |
|---|---|---|---|
|  | X-1 | X-2 | X-3 |
| Analytical value |  |  |  |
| Modification ratio by infrared spectrum method | 0.25 | 0.23 | 0.22 |

Note:
Contents of polyalkylene glycol segment (wt. %):
A-1 = 77;
A-2 = 72;
A-3 = 65

Examples 1 to 8 and Comparative Examples 1 to 3

Using a kneader "TEX-44 Type" (manufactured by Japan Steel Works, Ltd.; cylinder diameter: 44 mm) maintained at a temperature of 160 to 220° C., the polyester type thermoplastic elastomer (A-3), the modified polyester type elastomer (X-1 to X-3), and the EVOH resin "SOARNOL DC3203JB" produced by Nippon Synthetic Chemical Industries Co., Ltd. (ethylene content: 32 mol %; MFR: 5.7 g/10 min as measured at 230° C. under a load of 2.16 kg) were melt-kneaded together and then pelletized by a pelletizer, thereby obtaining a thermoplastic resin composition. The thus obtained thermoplastic resin composition in the form of pellets was injection-molded at a temperature of 180 to 220° C. to produce a flat plate-shaped molded product having a width of 80 mm, a length of 120 mm and a thickness of 2 mm. In Table 2, there are shown Examples 1 to 5 and Comparative Examples 1 and 2 using thermoplastic resin compositions containing a large amount of the EVOH resin. Whereas, in Table 3, there are shown Examples 6 to 8 and Comparative Example 3 using thermoplastic resin compositions containing a large amount of the modified polyester type elastomer. The results from these Examples and Comparative Examples are shown in Tables 2 and 3. In these Tables, the dash "-" represents no addition, and the slash mark "/" represents "unmeasured".

TABLE 2

| Thermoplastic resin composition |  | Examples |  |  |  |  | Comp. Examples |  |
|---|---|---|---|---|---|---|---|---|
|  |  | 1 | 2 | 3 | 4 | 5 | 1 | 2 |
| Composition (wt. %) |  |  |  |  |  |  |  |  |
| Polyester type thermoplastic elastomer | A-3 | — | — | — | — | — | — | 10 |
| Modified polyester-based thermoplastic elastomer | X-1 | — | — | — | 10 | — | — | — |
|  | X-2 | — | — | — | — | 10 | — | — |
|  | X-3 | 5 | 10 | 20 | — | — | — | — |
| EVOH resin |  | 95 | 90 | 80 | 90 | 90 | 100 | 90 |
| Evaluation |  |  |  |  |  |  |  |  |
| Melt flow rate (MFR) (g/10 min) |  | 5.1 | 4.4 | 3.1 | 3.6 | 3.7 | 5.7 | 5.3 |
| Hardness |  | 83 | 83 | 78 | 81 | 82 | 86 | 80 |
| Tensile strength At breaking (MPa) |  | 67 | 62 | 46 | 54 | 55 | 71 | 52 |
| Tensile elongation At breaking (%) |  | 200 | 194 | 49 | 42 | 107 | 214 | 33 |
| Flexural modulus (MPa) |  | 3815 | 3557 | 3008 | 3503 | 3571 | 4214 | 3669 |
| Izod impact strength (kJ/m$^2$) |  | 25 | 39 | 55 | 13 | 12 | 5 | 11 |

TABLE 2-continued

| Thermoplastic resin composition | Examples | | | | | Comp. Examples | |
|---|---|---|---|---|---|---|---|
| | 1 | 2 | 3 | 4 | 5 | 1 | 2 |
| Delamination of surface layer of molded product | A | A | A | A | A | A | B |
| Oxygen gas permeability (cm³/m² · 24 hr · atm) | 60 | 62 | 57 | 60 | 61 | 62 | 83 |
| Nitrogen gas permeability (cm³/m² · 24 hr · atm) | 54 | 56 | 52 | 55 | 56 | 57 | 57 |
| Haze (%) | 0.7 | 1.4 | 6.2 | 1.7 | 1.5 | 0.3 | 3.3 |

Note:
Contents of polyalkylene glycol segment (wt. %):
A-3 = 65; X-1 = 77; X-2 = 72; X-3 = 65

TABLE 3

| Thermoplastic resin composition | | Examples | | | Comp Example |
|---|---|---|---|---|---|
| | | 6 | 7 | 8 | 3 |
| Composition (wt. %) | | | | | |
| Polyester type thermoplastic elastomer | A-3 | — | — | — | — |
| Modified polyester-based thermoplastic elastomer | X-1 | — | — | — | — |
| | X-2 | — | — | — | — |
| | X-3 | 50 | 80 | 90 | 100 |
| EVOH resin | | 50 | 20 | 10 | — |
| Evaluation | | | | | |
| Melt flow rate (MFR) (g/10 min) | | 0.4 | 49 | 65 | 70 |
| Hardness | | 57 | 44 | 40 | 33 |
| Tensile strength At breaking (MPa) | | 30 | 12 | 11 | 13 |
| Tensile elongation At breaking (%) | | 103 | 695 | 793 | 1037 |
| Flexural modulus (MPa) | | 178 | 73 | 47 | 36 |
| Izod impact strength (kJ/m²) | | 23 | NB | NB | NB |
| Delamination of surface layer of molded product | | A | A | A | A |
| Oxygen gas permeability (cm³/m² · 24 hr · atm) | | 1936 | 4530 | 5130 | 5450 |
| Nitrogen gas permeability (cm³/m² · 24 hr · atm) | | 457 | 1480 | 1680 | 2040 |

Note:
Contents of polyalkylene glycol segment (wt. %):
A-3 = 65;
X-1 = 77;
X-2 = 72;
X-3 = 65

Tables 2 and 3 show the following results:

(1) In Comparative Example 1 in which no modified polyester type elastomer was blended, the obtained composition was deteriorated in Izod impact strength;

(2) In Comparative Example 2 in which non-modified polyester type elastomer was blended, the obtained molded product suffered from delamination of its surface layer;

(3) In Comparative Example 2 in which no EVOH resin was blended, the obtained molded product was deteriorated in hardness, and showed a low gas-barrier property; and (4) The thermoplastic resin compositions obtained in Examples 1 to 5 were excellent in mechanical strength, appearance and gas-barrier property as compared to the compositions obtained in corresponding Comparative Examples 1 and 2, and the thermoplastic resin compositions obtained in Examples 6 to 8 were well-balanced between flexibility and gas-barrier property as compared to the composition obtained in corresponding Comparative Example 3.

What is claimed is:

1. A thermoplastic resin composition comprising an ethylene-vinyl alcohol copolymer and a modified polyester thermoplastic elastomer produced by modifying a polyester thermoplastic elastomer with an unsaturated carboxylic acid or its derivative.

2. A thermoplastic resin composition according to claim 1, wherein the polyester thermoplastic elastomer contains an polyalkylene ether glycol segment.

3. A thermoplastic resin composition according to claim 2, wherein the polyester thermoplastic elastomer contains the polyalkylene ether glycol segment in an amount of 5 to 90% by weight.

4. A thermoplastic resin composition according to claim 1, wherein the polyester thermoplastic elastomer is modified in the presence of a radical generator.

5. A thermoplastic resin composition according to claim 4, wherein 100 parts by weight of the polyester thermoplastic elastomer is modified with 0.01 to 30 parts by weight of the unsaturated carboxylic acid or its derivative in the presence of 0.001 to 3 parts by weight of the radical generator.

6. A thermoplastic resin composition according to claim 1, wherein a normalized modification ratio of the polyester thermoplastic elastomer is 0.01 to 15.

7. A thermoplastic resin composition according to claim 1, wherein contents of the modified polyester thermoplastic elastomer and the ethylene-vinyl alcohol copolymer are 5 to 95% by weight and 95 to 5% by weight, respectively, with the proviso that a total content of the polyester thermoplastic elastomer and the ethylene-vinyl alcohol copolymer is 100% by weight.

8. A thermoplastic resin composition according to claim 1, wherein contents of the modified polyester thermoplastic elastomer and the ethylene-vinyl alcohol copolymer are 5 to 45% by weight and 95 to 55% by weight, respectively, with the proviso that a total content of the polyester thermoplastic elastomer and the ethylene-vinyl alcohol copolymer is 100% by weight.

9. A thermoplastic resin composition according to claim 1, wherein contents of the modified polyester thermoplastic elastomer and the ethylene-vinyl alcohol copolymer are 5 to 30% by weight and 95 to 70% by weight, respectively, with the proviso that a total content of the polyester thermoplastic elastomer and the ethylene-vinyl alcohol copolymer is 100% by weight.

10. A thermoplastic resin composition according to claim 1, wherein the thermoplastic resin composition has a oxygen gas permeability of not more than 100 cm³/m²·24 hr·atm, a haze of not more than 10% and an Izod impact strength of not less than 20 kJ/m².

11. A multi-layer laminate comprising a layer A comprising the thermoplastic resin composition as defined in claim 1, and at least one layer B comprising a thermoplastic resin composition other than the composition as defined in claim 1 which is laminated on one or both surfaces of the layer A.

12. A multi-layer laminate according to claim 11, wherein the other thermoplastic resin composition constituting the layer B comprises a polyester, a thermoplastic resin composition containing the polyester, a polyester elastomer resin, an adhesive resin for polyolefin, an ethylene-vinyl alcohol copolymer or a thermoplastic resin composition containing the ethylene-vinyl alcohol copolymer.

13. A multi-layer laminate according to claim 12, wherein the B layer comprises the adhesive resin for polyolefin and a layer C comprising a polyolefin resin is further laminated on the layer B.

14. A multi-layer laminate according to claim 11, comprising the layer A and the layer B which comprises polyethylene terephthalate and is laminated on both surfaces of the layer A.

* * * * *